(No Model.) 2 Sheets—Sheet 1.
D. HITCHCOCK.
CAR FENDER.
No. 566,174. Patented Aug. 18, 1896.
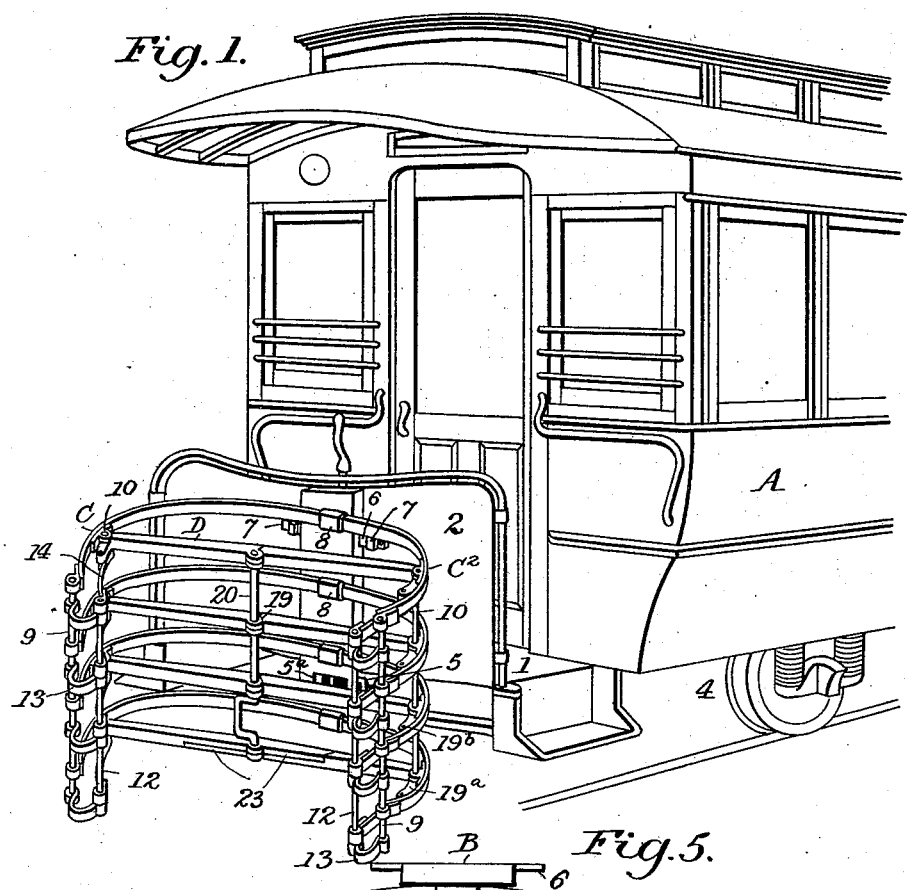
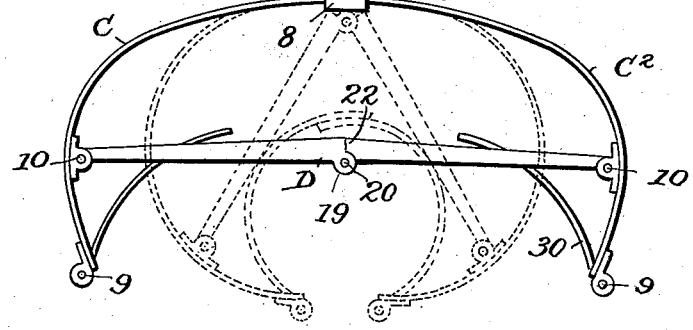
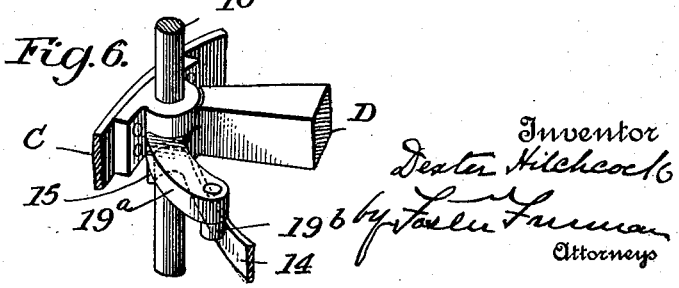
Witnesses
Jno. G. Hinkel
J. A. Hargrave
Inventor
Dexter Hitchcock
by Josler Freeman
Attorneys (No Model.) 2 Sheets—Sheet 2.

D. HITCHCOCK.
CAR FENDER.

No. 566,174. Patented Aug. 18, 1896.

Witnesses
Inventor
Dexter Hitchcock
by
Attorneys

UNITED STATES PATENT OFFICE.

DEXTER HITCHCOCK, OF NORWALK, CONNECTICUT.

CAR-FENDER.

SPECIFICATION forming part of Letters Patent No. 566,174, dated August 18, 1896.

Application filed November 29, 1895. Serial No. 570,471. (No model.)

*To all whom it may concern:*

Be it known that I, DEXTER HITCHCOCK, a citizen of the United States, residing at Norwalk, in the county of Fairfield and State of Connecticut, have invented certain new and useful Improvements in Car-Fenders, of which the following is a specification.

This invention relates to an improvement in safety devices for street-cars, adapted more particularly for use on those cars or vehicles propelled by electricity, cables, or other than horse-power, and having for its object to provide a simple, cheap, and effective device for preventing injury and loss of life.

With these objects in view the invention consists in the novel details of construction and arrangement of the parts hereinafter more fully described, whereby the objects of the invention are attained.

Figure 2:
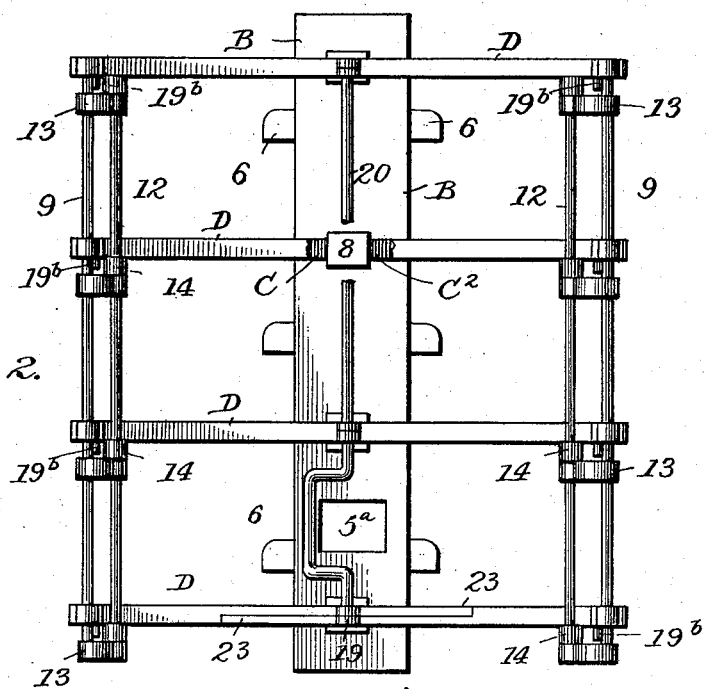
Figure 3:
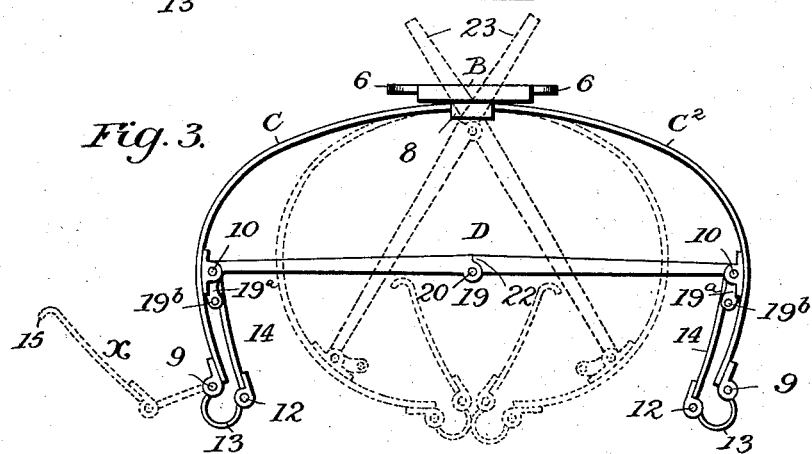
Figure 4:
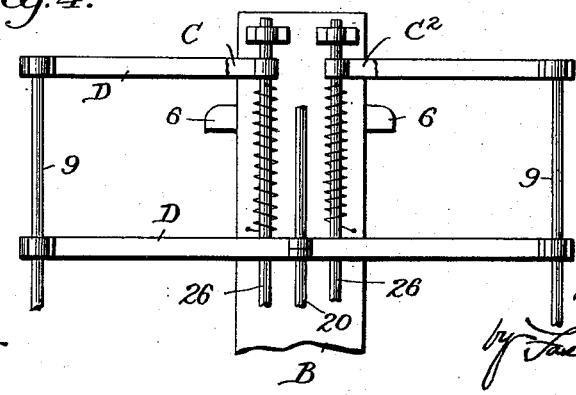

In the accompanying drawings, forming a part of this specification, and in which like letters of reference indicate corresponding parts, Figure 1 is a perspective view of a car with my invention attached thereto. Fig. 2 is a front elevation of the fender detached from the car and in its normal position. Fig. 3 is a plan view thereof when in its normal position, its closed position being indicated by dotted lines. Fig. 4 is a front elevation of a modification, and Fig. 5 is a plan view of another modification. Fig. 6 is a detail perspective view of the connections between the gripper-arms, toggle-levers, and spring-fingers.

Referring to the drawings, A denotes the body of a car, which may be of any suitable construction and provided with the usual platforms 1, dashboard 2, truck 4, and couplers 5.

B is the supporting-plate, upon which all the parts of the invention are supported. This plate is secured vertically in front of the dashboard 2 at the center thereof, preferably by means of lugs 6, which engage brackets 7 of the dashboard. By this arrangement the fender may be readily detached from one end of the car and attached to the other, according to the direction of travel of the car, by simply lifting the plate B to carry the lugs out of engagement with the brackets 7. Near its lower end the supporting-plate is provided with an opening $5^a$, alining with the coupler 5, whereby two cars may be coupled without necessitating the removal of the plate B from the car.

Extending horizontally from the supporting-plate B are spring gripper-arms C $C^2$, arranged in vertical parallel series, the lowest arm of each series being slightly elevated above the track. These arms C $C^2$ are oppositely curved and extend laterally and forwardly from the supporting-plate, and their natural tendency is to spring together until their outer or free ends make contact or pass each other. When in this position, the arms form substantially an ellipse. These are, however, normally held separated or distended to such an extent that their outer ends are approximately in vertical alinement with the rails of the track. The means for accomplishing this will be presently described.

The gripper-arms C $C^2$ may be formed in any desirable manner and of any suitable material and may be made in one or more pieces. I prefer, however, to form both arms of a single rod or bar of spring metal, as shown in Figs. 1 to 3. When thus formed, the said arms C $C^2$ are secured at their centers in sockets 8 of the supporting-plate B. If desired, other means than those shown may be employed for holding the gripper-arms. At their outer ends each series of arms C $C^2$ is connected by means of a vertical rod 9, which serves to impart stability to the frame and also serves to prevent the ends of the gripper-arms from sagging.

Arranged in the rear of the rods 9 and parallel thereto are bars 10, which are connected to the gripper-arms at each point of intersection. Rods 12, similar in construction to the rods 9, are connected to said rods by means of springs 13. Carried upon the rods 12 are a series of curved fingers 14, the outer ends of which are provided with hooks 15. Normally the rods 12 occupy a position slightly in advance of the rods 9 and are held in this position against the action of the springs 13 by means of hooks 15 of the fingers 14. In practice and when in their normal positions the curved fingers are brought to the inner faces of the gripper-arms, to the contour of which they conform, and are held in this position by means of the hooks 15, which engage the bars 10. When the rods 12 make contact with an object, they are pressed toward the rods 9 sufficiently to release the hooks 15 from engagement with the bars 10, whereupon the fingers 14 are moved rapidly outward in the arc of a circle to a point substantially at right angles to the gripper-arms. This outward movement of the fingers 14 carries the object which has been struck to the side of the track, as indicated in dotted lines $x$, Fig. 3.

Pivotally connected to each of the bars 10 or, if desired, to the gripper-arms is a horizontal series of levers D, which are pivoted together at 19 by means of a vertical rod 20 to form toggles. These levers are arranged intermediate the gripper-arms C, and when in their straightened position said arms are held in their normally-separated positions. The outward movement of the said levers is limited by means of shoulders 22, arranged at their point of junction.

At their pivotal points 10 the levers B are each provided with arms $19^a$, which carry lugs $19^b$. These arms extend at an angle to the levers to bring the lugs $19^b$ against the outer faces of the curved fingers 14. The purpose of this will be presently described.

The lower levers D of the series are extended beyond their pivoted point 19 to form arms 23, which, when the levers are moved rearwardly, bear upon the upper face of a cross-bar of the car A and aid in supporting the gripper-arms.

From the above it will be apparent, assuming of course that the gripper-arms are in their normally-distended positions, that when an object upon the track is struck by the levers said levers are caused to move toward the car from their straightened position to one at an angle to each other, and the ends of the gripper-arms, which have been released by the rearward movement of the levers D, are moved rapidly toward each other. Simultaneously with the rearward movement of the levers D and the closing of the gripper-arms the curved fingers 14 are released by means of the lugs $19^b$, which are caused to move rearwardly with the levers D and force the fingers 14 out of engagement with the bars 10. Upon the release of these fingers, which takes place after the gripper-arms have become partially closed, they are moved outward by their springs 13 and are caused to embrace the object between the gripper-arms, as indicated by dotted lines of Fig. 3. It will thus be obvious that an object which has been struck is completely encircled by the gripper-arms and spring-fingers and levers D, which hold it against injury until the car comes to a full stop, when it can be released by resetting the fender to its normal position. It will be noted, too, that as the ends of the curved fingers are disconnected and each finger is operated by a separate spring they may readily conform to the outline of the object struck by the fender. For instance, suppose it is a person who has been struck by the fender, the lower part of his body is smaller in diameter than the upper part and it would be necessary for the lower series of curved fingers to move closer together than the upper series in order to encircle the person, and this I am enabled to accomplish by arranging each finger to be operated independently of the others. By extending the levers the whole distance between the gripper-arms it will be obvious that whatever may be the position upon the track of the object which is struck, the levers D will be operated and the grippers caused to close around the object. It will be understood of course that the force employed in throwing the gripper-arms together is not sufficiently great to bruise or otherwise injure the object caught between them, and as an additional precautionary measure against this I prefer to provide the gripper-arms, their connecting-rods, and the levers D with suitable pads or cushions. These cushions are not shown in the drawings, but their arrangement will be perfectly well understood.

In the modification illustrated in Fig. 4 the gripper-arms are formed in two series of opposing sections, each series being secured upon a spring-actuated shaft 26, journaled upon the supporting-plate B.

In the construction illustrated by Fig. 5, each gripper-arm C $C^2$ is provided upon its inner face with a short curved arm 30, the arms of the gripper-arms C and those of the gripper-arms $C^2$ being oppositely curved. By this arrangement, when the gripper-arms are brought together said arms and the shorter arms 30 form substantially a circle in front of the levers D, as indicated in dotted lines.

Without limiting myself to the exact details of construction and arrangement shown and described, what I claim is—

1. In a safety device, the combination of the opposing spring gripper-arms each formed of a single piece, means for holding said arms normally distended, and devices extending from one gripper-arm to the other for releasing said gripper-arms to permit them to move together, substantially as described.

2. In a safety device, the combination of the opposing spring gripper-arms each formed of a single piece, means for holding said arms normally distended and devices for releasing the gripper-arms to permit them to move together, substantially as described.

3. In a safety device, the combination of two opposing series of gripper-arms, means for holding said arms normally distended, and a series of releasing devices for releasing the gripper-arms to permit them to move together simultaneously, the series of releasing devices being connected whereby when one or more of the series is affected they all are operated substantially as described.

4. In a safety device, the combination of two opposing series of gripper-arms, vertical rods at the ends of said arms, fingers, connections between the fingers and rods, means for holding the fingers normally in contact with the gripper-arms, and devices adapted to be operated by impact for releasing said fingers to permit them to swing outwardly, substantially as described.

5. In a safety device, the combination of two opposing series of gripper-arms, vertical rods at the ends of said arms, similar rods arranged normally in advance of the first-mentioned rods, fingers on said rods, yielding spring connections between the rods, means for holding the fingers normally in contact with the inner faces of the gripper-arms, and devices adapted to be operated by impact for releasing the fingers to permit them to move outwardly in the arc of a circle, substantially as described.

6. In a safety device, the combination with two opposing series of spring-controlled gripper-arms, of two series of spring-actuated fingers pivotally mounted upon the gripper-arms, means for holding the gripper-arms and fingers normally distended, and devices for simultaneously releasing the fingers and gripper-arms, substantially as described.

7. In a safety device, the combination with two series of spring-controlled gripper-arms, of two series of spring-actuated fingers, means for holding the gripper-arms and fingers normally distended, means for releasing the gripper-arms and fingers simultaneously, and devices for releasing the fingers independent of the releasing means of the gripper-arms, substantially as described.

In testimony whereof I have signed my name to this specification in the presence of two subscribing witnesses.

DEXTER HITCHCOCK.

Witnesses:
WM. A. CURTIS,
FRED A. ELLS.